United States Patent [19]
Halm et al.

[11] Patent Number: 5,651,296
[45] Date of Patent: *Jul. 29, 1997

[54] DEVICE FOR PROVIDING PROTECTION AGAINST DEBRIS PRODUCED BY A PYRO BOLT CUTTER

[75] Inventors: Rudolf Halm, Rijnsburg; Peter Gerald Edwards, Hazerswoude-Dorp, both of Netherlands

[73] Assignee: Agence Spatiale Europeenne, Paris, France

[*] Notice: The terminal 38 months of this patent has been disclaimed.

[21] Appl. No.: 787,839

[22] Filed: Nov. 5, 1991

[30] Foreign Application Priority Data

Nov. 6, 1990 [FR] France .................. 90 13706

[51] Int. Cl.⁶ .................................................. B26D 7/01
[52] U.S. Cl. .................. 83/451; 83/639.4; 83/745; 30/180
[58] Field of Search ........................... 83/639.4, 451, 83/944, 78, 745; 30/92, 180, DIG. 4; 221/63

[56] References Cited

U.S. PATENT DOCUMENTS

| | | | |
|---|---|---|---|
| 3,114,962 | 12/1963 | Brown | 29/200 |
| 3,147,663 | 9/1964 | Brown | 85/33 |
| 3,246,396 | 4/1966 | Temple et al. | 30/180 |
| 3,393,605 | 7/1968 | Parnell | 30/180 X |
| 3,643,329 | 2/1972 | Lieberman | 30/DIG. 4 X |
| 5,138,124 | 8/1992 | Kirk et al. | 83/944 |

FOREIGN PATENT DOCUMENTS

| | | | |
|---|---|---|---|
| 2401358 | 7/1974 | Germany | 83/639.4 |
| 1423307 | 9/1988 | U.S.S.R. | 83/451 |
| 2074491 | 11/1981 | United Kingdom | 30/92 |

*Primary Examiner*—Kenneth E. Peterson
*Assistant Examiner*—David John Kalil
*Attorney, Agent, or Firm*—Antonio R. Durando; Harry M. Weiss

[57] ABSTRACT

A device for providing protection against the debris produced by a bolt that can be cut by a pyro bolt cutter, in particular through the use of a pyrotechnic device, the device including a confinement enclosure which surrounds the body of the bolt where it leaves the cutting device, and including resiliently deformable members such as membranes that are slit in their centers, with the body of the bolt passing in a substantially sealed manner through the centers of the membranes. The device serves to trap inside the confinement enclosure the debris that are produced when the bolt is cut, and it is particularly applicable to the aerospace industry.

6 Claims, 1 Drawing Sheet

DEVICE FOR PROVIDING PROTECTION AGAINST DEBRIS PRODUCED BY A PYRO BOLT CUTTER

The invention relates to a device for providing protection against the debris produced by a bolt that is cut by a pyro bolt cutter, the bolt being of the type used, in particular, in mechanisms for holding and deploying antennas or other appendages mounted on satellites or other space vehicles.

BACKGROUND OF THE INVENTION

On space vehicles, deployable appendages, such as antennas, sensor booms, solar arrays, etc., which are relatively fragile and bulky, must be rigidly fixed in a folded or retracted state to the spacecraft structure so as to be protected against stresses during launch. After launch and when the satellite or space vehicle is in orbit, these appendages must be released and deployed so that they can perform their functions.

Bolts that can be cut on command, generally by firing a pyrotechnic device, are the means most commonly used in such mechanisms for fixing moving parts to fixed parts. Such bolts are of the prestressed type or of the type having a weakened zone, and when they are cut they give rise to particles or metal fragments having high kinetic energy that can lead to various kinds of risks, such as short circuits, mechanism jamming, damage to waveguides, etc . . . .

In an attempt to mitigate these drawbacks, proposals have already been made to replace such bolts by stranded metal cables optionally provided with outer coatings of plastic. Cutting such cables produces fragments that are smaller in size than those of metal bolts, but there are always large quantities of them. In addition, the mechanical constraints related to using cables that are relatively flexible limit the range of possible applications.

Proposals have also been made to use bolts of synthetic material, capable of being cut by melting using a hot conductor wire heated by the Joule effect. Cutting in this way does not produce any splinters or fragments of material, but it does cause organic compounds to be vaporized and this can cause unacceptable pollution in a satellite or a space vehicle, in particular since the compounds are likely to be deposited on optical components.

The invention seeks to avoid all of the prior art drawbacks associated with using bolts that can be cut on command. An object of the invention is to provide a device giving protection against the debris produced by a metal bolt that is cut on command, in particular by pyrotechnic means, the device serving to trap in a small space all of the metal debris produced by a bolt on being cut.

Another object of the invention is to provide a device of this type capable of being used with a very high degree of reliability in satellites or space vehicles.

SUMMARY OF THE INVENTION

The present invention provides a device for providing protection against the debris produced by a bolt that is cut by a pyro bolt cutter, the bolt being of the type that can be used, in particular, in mechanisms for holding and for releasing antennas or other appendages mounted on satellites or other space vehicles. In such mechanisms, a moving component is held to a fixed component by means of a bolt whose body passes through cutting means of the pyrotechnically controlled type. The device comprises a confinement enclosure surrounding the body of the bolt when it leaves the cutting means and including resiliently deformable means having a passage formed therethrough receiving the body of the bolt in substantially sealed manner. The enclosure is capable of closing automatically when the body of the bolt is removed therefrom, thereby trapping in the confinement enclosure the debris produced by cutting the bolt.

This confinement enclosure may be constituted by a sleeve or ring that surrounds the body of the bolt and is fixed at its base to a housing enclosing the cutting means while the end opposite the housing includes the above-mentioned resiliently deformable means.

Such an enclosure can thus be compact, and compatible with the space available for installing it in association with the mechanisms for holding and deploying appendages on satellites or other space vehicles.

The invention also makes it possible to use tested conventional type metal bolts that can be cut on command, while avoiding the drawbacks associated with the prior art use of such bolts.

In a preferred embodiment of the invention, the above-mentioned resiliently deformable means comprises a stack of diaphragms or membranes having the body of the bolt passing through the centers thereof, and held at their edges by a surrounding wall of the enclosure.

These membranes include central slits of limited length forming the above-mentioned passage, slits being four in number, for example, and being spaced apart at 90° intervals from one another.

Preferably, these slits in the membranes are offset angularly from one membrane to another, to provide better sealing of the metal debris produced by rupturing the body of the bolt.

The material from which the resiliently deformable membranes are made is determined as a function of the conditions of use.

For satellites or space vehicles, the material may be a silicone rubber satisfying a certain number of determined characteristics.

BRIEF DESCRIPTION OF THE DRAWINGS

An embodiment of the invention is described by way of example with reference to the accompanying drawing, in which.

DETAILED DESCRIPTION

Figure 1:
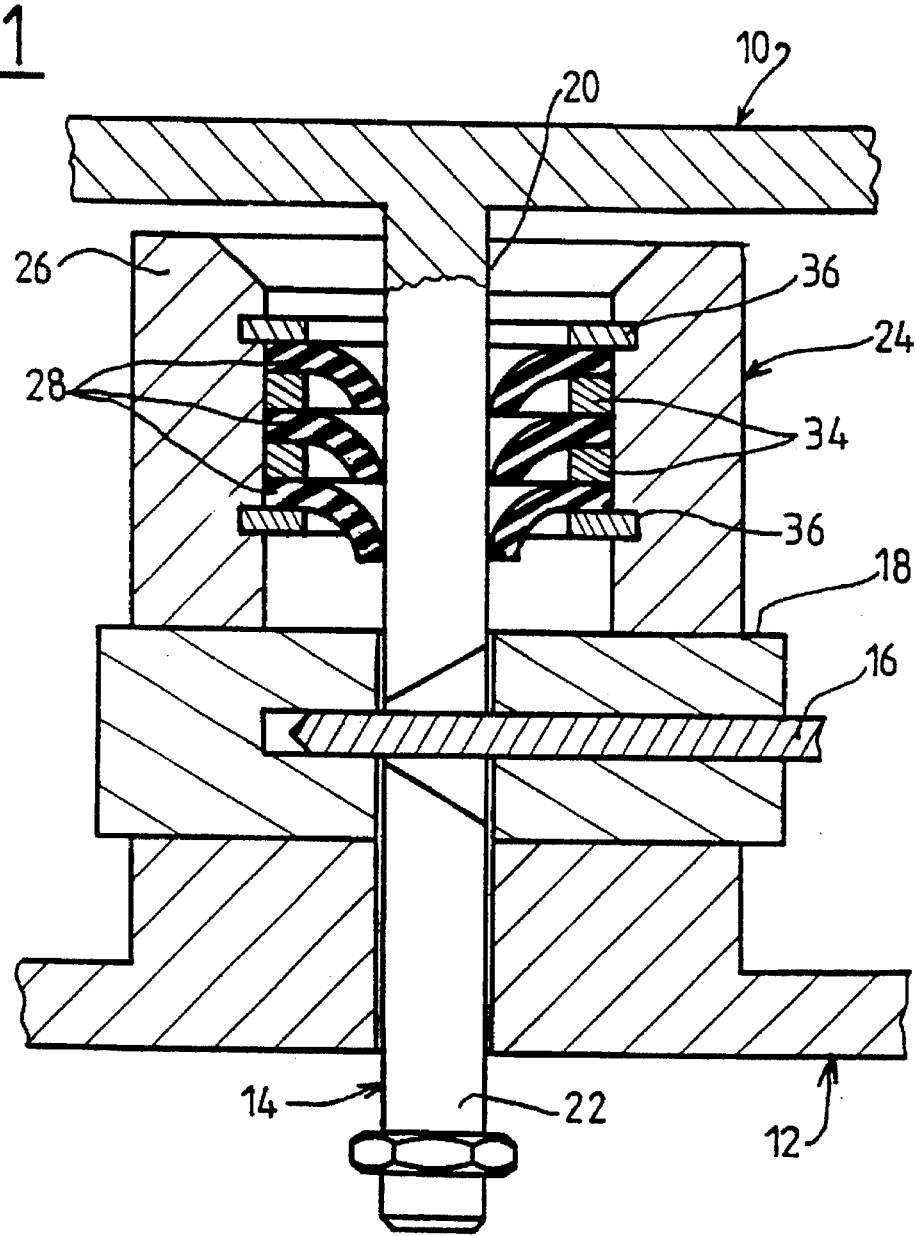
FIG. 1 is a diagrammatic axial section view through a device of the invention in association with a bolt that can be cut on command.

In the example of FIG. 1, a moving component 10 is rigidly retained on a fixed structure 12 by means of a metal bolt 14 associated with cutting means comprising, for example, a blade or chisel 16 guided perpendicularly to the axis of the bolt 14 in a housing 18 secured to the fixed structure 12.

In conventional manner, firing a pyrotechnic device causes the chisel 16 to move into the position shown in FIG. 1, thereby rupturing the body of the bolt 14 into two portions, one of which portions 20 remains connected to the moving component 10 which is thus released while the other portion 22 remains inside the fixed structure 12.

Cutting the metal bolt 14 by means of the chisel gives rise to a quantity of metal debris having high kinetic energy, and liable to be ejected from the housing 18, thereby posing various kinds of risks, as mentioned above.

The invention provides for trapping the metal debris by means of a confinement enclosure 24 which surrounds the body of the bolt 14 where it leaves the housing 18 that includes the cutting means. In the example shown, this confinement enclosure 24 comprises a metal ring or sleeve 26 which is cylindrical in shape, coaxial with the body of the bolt 14, and having its base secured to the housing 18 while its opposite end may constitute an abutment for the moving component 10 while it is retained by the bolt 14.

Going away from the housing 18, the confinement enclosure 24 is closed by a series of resiliently deformable membranes 28 each of which includes an opening through which the portion 20 of the bolt connected to the moving component 10 is passed.

Figure 2:
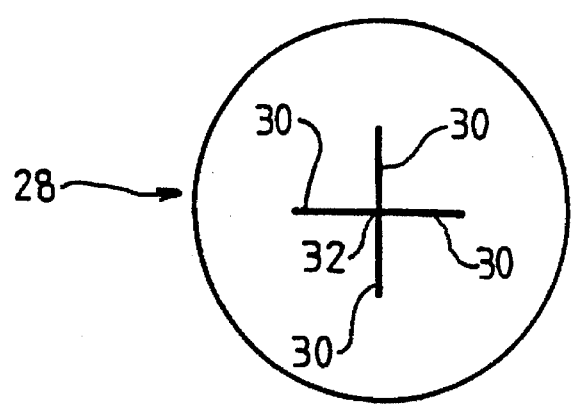
FIG. 2 is a plan view of a membrane constituting a portion of the device of the invention.

As can be seen more clearly in FIG. 2, each membrane is circular in shape and has radial slits 30 running from its center 32 over a length that is a function of the radius of the body of the bolt 14 so that the body is capable of passing in substantially sealed manner through each membrane 28 without tearing it and without the membrane preventing the portion 20 of the body of the bolt moving when the equipment of which the moving component 10 forms a part is released or deployed. In the example shown in FIG. 2, there are four slits 30 angularly spaced apart at 90° from one another.

The outside diameter of the membranes 28 is substantially equal to the inside diameter of the ring or sleeve 26 and the membranes are stacked inside the ring or sleeve 26 while being spaced apart from one another by annular spacers 34 of appropriate thickness. The stack of membranes 28 and spacers 34 is positioned inside the ring or sleeve 26 between two conventional type resilient split washers 36 which are received in grooves in the cylindrical inside wall of the ring or sleeve 26.

This device operates as follows:

While the moving component 10 is held on the fixed component 12 by the bolt 14, the central portions of the membrane 28 determined by the slits 30 bend along the body of the bolt towards the housing 18 as shown in FIG. 1. The distance between the base of the sleeve 26 and the bottom washer 36 is sufficient to avoid interfering with the bending of the central portion of the bottom membrane 28. In this position, the central portions of the membranes have the portion 20 of the body of the bolt passing through them in substantially sealed manner.

By firing the pyrotechnic device, the chisel 16 is caused to slice through the body of the bolt, thereby releasing the moving component 10. The metal debris produced by rupturing the body of the bolt is trapped inside the enclosure 24 by the membranes 28, both while the portion 20 of the body of the bolt is still engaged in the slits through the membranes, and after it has been extracted therefrom, since the membranes close automatically by virtue of their own resilience as soon as they are free of the body of the bolt.

The slits of the various membranes 28 are preferably offset angularly relative to one another about the axis of the ring or sleeve 26 so that they are not in alignment from one membrane to the next.

The membranes 28 may be made, for example, of a silicone rubber having a high degree of elasticity and a low coefficient of friction on the body of the bolt, so as not to hinder displacement thereof.

When devices of the invention are used in satellites or space vehicles, the material from which the membranes are made is selected to satisfy a certain number of criteria:

the membranes must be capable of remaining in a resiliently deformed state (i.e. while the body of the bolt is passing through them) for a relatively long period of time, e.g. as long as one year, without their characteristics being degraded;

they must be capable of being used at very low temperatures (down to about −50° C.);

their mechanical characteristics and their frictional behavior must be compatible with the operating characteristics of the release mechanisms for the antennas or other appendages of space vehicles;

they must not produce or release by degassing any condensible compounds that could pollute the environment (by depositing on optical components, for example); and they must be compatible with the other materials with which they are in contact (in particular they must not give rise to corrosion or chemical interaction with the metal of the bolt).

Systematic tests have shown that a material that is particularly suitable for use in such membranes in the aerospace industry is the silicone rubber that is sold under the name Erika. The outgassing capacity of this material can be reduced by heating it in an oven at 200° C. for about twenty-four hours.

Tests under extreme conditions of temperature and pressure have served to verify that the device of the invention operates properly and is reliable.

We claim:

1. A device for providing protection against the debris produced by cutting a bolt of the type which holds antennas and other appendages mounted on satellites and other space vehicles, the bolt passing through cutting means and having a projecting portion which extends from the cutting means, the device comprising a confinement enclosure having a surrounding wall for receiving the projecting portion of the bolt, and resiliently deformable means in the confinement enclosure, the resiliently deformable means having deflectable portions, each of said deflectable portions being movable between a first position in which the resiliently deformable means defines a passage for the projecting portion of the bolt with the deflectable portions arranged to bear against the projecting portion of the bolt in a substantially sealed manner, and a second position in which the passages is substantially closed, and, when the projecting portion of the bolt is removed from the resiliently deformable means, each of the deflectable portions automatically move from the first position to the second position thereby trapping in the confinement enclosure the debris produced by cutting the bolt, the surrounding wall of the confinement enclosure being provided with a pair of grooves, and the device further comprising a resilient washer in each of the grooves, the resiliently deformable means including a stack of membranes which are held between the washers and are provided with the deflectable portions.

2. A device according to claim 1, wherein each of the membranes is provided with equally spaced central slits defining the deflectable portions of the resiliently deformable means.

3. A device according to claim 2, wherein the slits in the membranes are offset angularly from one membrane to another.

4. A device according to claim 1, wherein the membranes have outer edges; and further comprising spacers separating the membranes from one another at their outer edges.

5. A device according to claim 1, wherein the membranes are made of a silicone rubber.

6. A device according to claim 1, wherein the confinement enclosure is constituted by a sleeve having a first end secured to a housing containing the cutting means, the sleeve further having a second end opposite the housing containing the resiliently deformable means.

* * * * *